United States Patent
Pedersen et al.

(10) Patent No.: US 10,032,021 B2
(45) Date of Patent: Jul. 24, 2018

(54) METHOD FOR DETECTING A THREAT AND THREAT DETECTING APPARATUS

(71) Applicant: LEIDOS INNOVATIONS TECHNOLOGY, INC., Gaithersburg, MD (US)

(72) Inventors: Richard N. Pedersen, Toms River, NJ (US); Thomas Plummer, Cherry Hill, NJ (US); Ben Anthony Calloni, Willow Park, TX (US); Peter Alan Vanemburg, Hopewell, NJ (US)

(73) Assignee: LEIDOS INNOVATIONS TECHNOLOGY, INC., Gaithersburg, MD (US)

( * ) Notice: Subject to any disclaimer, the term of this patent is extended or adjusted under 35 U.S.C. 154(b) by 142 days.

(21) Appl. No.: 14/952,204

(22) Filed: Nov. 25, 2015

(65) Prior Publication Data
US 2017/0147815 A1  May 25, 2017

(51) Int. Cl.
*G06F 3/00* (2006.01)
*G06F 21/56* (2013.01)
*G06F 21/55* (2013.01)
*G06K 9/62* (2006.01)
*H04L 29/06* (2006.01)

(52) U.S. Cl.
CPC ............ *G06F 21/56* (2013.01); *G06F 21/554* (2013.01); *G06F 21/564* (2013.01); *G06K 9/6296* (2013.01); *H04L 63/1416* (2013.01)

(58) Field of Classification Search
CPC .............................. G06F 21/554; G06F 21/56
See application file for complete search history.

(56) References Cited

U.S. PATENT DOCUMENTS

| | | | | |
|---|---|---|---|---|
| 7,523,434 | B1 * | 4/2009 | Taylor | G06F 17/5054 716/100 |
| 7,854,008 | B1 * | 12/2010 | Huang | G06F 21/564 726/24 |
| 8,225,408 | B2 * | 7/2012 | Rubin | G06F 8/427 713/153 |
| 8,402,541 | B2 * | 3/2013 | Craioveanu | G06F 21/563 712/233 |

(Continued)

*Primary Examiner* — Joseph P Hirl
*Assistant Examiner* — Sayed Beheshti Shirazi
(74) *Attorney, Agent, or Firm* — Oblon, McClelland, Maier & Neustadt, L.L.P.

(57) ABSTRACT

Aspects of the disclosure include a threat detecting apparatus. The threat detecting apparatus can include an interface circuit, an opcode detector, and a pattern analyzer. The interface circuit is configured to receive a data stream. The opcode detector can be configured to identify an opcode sequence embedded in the data stream based on a first model graph that includes a plurality of interconnected token nodes. Each token node is representative of an occurrence or a non-occurrence of a token. The pattern analyzer may be configured to identify an opcode signature embedded in the identified opcode sequence based on a second model graph, and to output a signal indicative of the successful identification of the opcode signature. The second model graph can include a plurality of interconnected opcode nodes, and each opcode node can be representative of an occurrence or a non-occurrence of a predetermined combination of one or more opcodes.

12 Claims, 9 Drawing Sheets

(56) References Cited

U.S. PATENT DOCUMENTS

| | | | | |
|---|---|---|---|---|
| 8,701,162 B1* | 4/2014 | Pedersen | ............... | G06F 21/564 |
| | | | | 370/352 |
| 2005/0108554 A1* | 5/2005 | Rubin | ..................... | G06F 8/427 |
| | | | | 713/187 |
| 2005/0187947 A1* | 8/2005 | Wortendyke | ........ | G06F 17/3046 |
| 2006/0107158 A1* | 5/2006 | Mishra | .................. | G06F 17/504 |
| | | | | 714/741 |
| 2010/0235913 A1* | 9/2010 | Craioveanu | ........... | G06F 21/563 |
| | | | | 726/23 |
| 2011/0302654 A1* | 12/2011 | Miettinen | ............. | G06F 21/552 |
| | | | | 726/23 |
| 2017/0031845 A1* | 2/2017 | Tzafrir | ................ | G06F 13/1668 |
| 2017/0147815 A1* | 5/2017 | Pedersen | ................ | G06F 21/56 |

* cited by examiner

METHOD FOR DETECTING A THREAT AND THREAT DETECTING APPARATUS

INCORPORATION BY REFERENCE

This present disclosure is related to U.S. Pat. No. 8,701, 162, "Method and System for Detecting and Countering Malware in a Computer" and U.S. patent application Ser. No. 13/617,879, "Method and System for Classifying Vehicle Tracks," filed on Sep. 14, 2012, which are incorporated herein by reference in their entireties.

BACKGROUND

Various types of threats to computers and networks, such as computer viruses, malware, ransomware, worms, trojan horses, rootkits, keyloggers, dialers, spyware, adware, rogue security software, or the like, are designed to cause detrimental effects on a target machine. In some applications, a threat detection device or program identifies the presence of a threat in a data stream by comparing the binary signatures of known threats with the data stream under inspection. A corresponding action against the data stream may be taken upon the detection of the threat. However, the threats are also being developed or even self-modified to conceal themselves. Merely relying on the binary signatures of known threats may not be sufficient to identify a newly-developed or newly-evolved threat.

SUMMARY

Aspects of the disclosure provide a threat detecting apparatus. The threat detecting apparatus includes an interface circuit, an opcode detector, and a pattern analyzer. The interface circuit is configured to receive a data stream. The opcode detector is configured to identify an opcode sequence embedded in the data stream based on a first model graph. The first model graph includes a plurality of interconnected token nodes. Each token node of the interconnected token nodes is representative of an occurrence or a non-occurrence of a token, and each token is a predetermined combination of bits or bytes. The pattern analyzer is configured to identify an opcode signature embedded in the identified opcode sequence based on a second model graph, and to output a signal indicative of the successful identification of the opcode signature. The second model graph includes a plurality of interconnected opcode nodes, and each opcode node of the interconnected opcode nodes is representative of an occurrence or a non-occurrence of a predetermined combination of one or more opcodes.

In an embodiment, the threat detecting apparatus includes a memory circuit configured to store at least a portion of the first model graph or at least a portion of the second model graph. The memory circuit can be configured to store a set of instructions, and the threat detecting apparatus may further include a processor configured to execute the set of instructions to function as the opcode detector or the pattern analyzer.

The threat detecting apparatus may include an application-specific integrated circuit (ASIC) configured to function as the opcode detector or the pattern analyzer. In an embodiment, at least a portion of the first model graph or a portion of the second model graph is hard-wired in the ASIC.

Aspects of the disclosure provide a method for detecting a threat. The method includes receiving a data stream by an interface circuit, identifying an opcode sequence embedded in the data stream by an opcode detector based on a first model graph, identifying an opcode signature embedded in the identified opcode sequence by a pattern analyzer based on a second model graph, and outputting a signal indicative of the successful identification of the opcode signature by the pattern analyzer. The first model graph includes a plurality of interconnected token nodes. Each token node of the interconnected token nodes is representative of an occurrence or a non-occurrence of a token, and each token is a predetermined combination of bits or bytes. The second model graph includes a plurality of interconnected opcode nodes, and each opcode node of the interconnected opcode nodes is representative of an occurrence or a non-occurrence of a predetermined combination of one or more opcodes.

In an embodiment, identifying an opcode sequence embedded in the data stream includes traversing the first model graph in N process threads based on the data stream and N possible byte alignments, where N is an integer greater than one.

In an embodiment, identifying an opcode sequence embedded in the data stream includes traversing the first model graph in one process thread based on the data stream, where the first model graph incorporates redundant paths based on N possible byte alignments of the data stream.

Aspects of the disclosure provide a threat detecting apparatus. The threat detecting apparatus includes a threat detection circuit that is configured to identify an opcode sequence embedded in a data stream based on a first model graph, identify an opcode signature embedded in the identified opcode sequence based on a second model graph, and output an indication signal indicative of the successful identification of the opcode signature. The first model graph includes a plurality of interconnected token nodes. Each token node of the interconnected token nodes is representative of an occurrence or a non-occurrence of a token, and each token is a predetermined combination of bits or bytes. The second model graph can include a plurality of interconnected opcode nodes, and each opcode node of the linked opcode nodes is representative of an occurrence or a non-occurrence of a predetermined combination of one or more opcodes.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

Operation code or opcode generally refers to machine code usable to instruct a processor to perform a predetermined operation. Such predetermined operations can include addition, shifting, moving, or copying of a number, or changing a pointer indicating a position of a to-be-executed machine code to a predetermined position, and the like. Each processor or digital controller may be designed to respond to a predetermined set of machine codes, or sometimes being referred to as instruction sets. Example machine codes include INTEL™ x86 instruction set and INTEL™ Streaming Single-instruction-multiple-data Extension (SSE) instruction set for INTEL™ x86 processors or other x86 compatible processors; 32-bit ARM™ instruction set and 16-bit Thumb instruction set for ARM™ processors or other ARM™ compatible processors; PowerPC Reduced Instruction Set Computing (RISC) instruction set for IBM™ PowerPC™ processors; or scalable processor architecture RISC instruction set for SUN™ SPARC™ processors. Of course, it should be understood that the invention can be applied to other existing or future machine codes equally as well.

Figure 1:
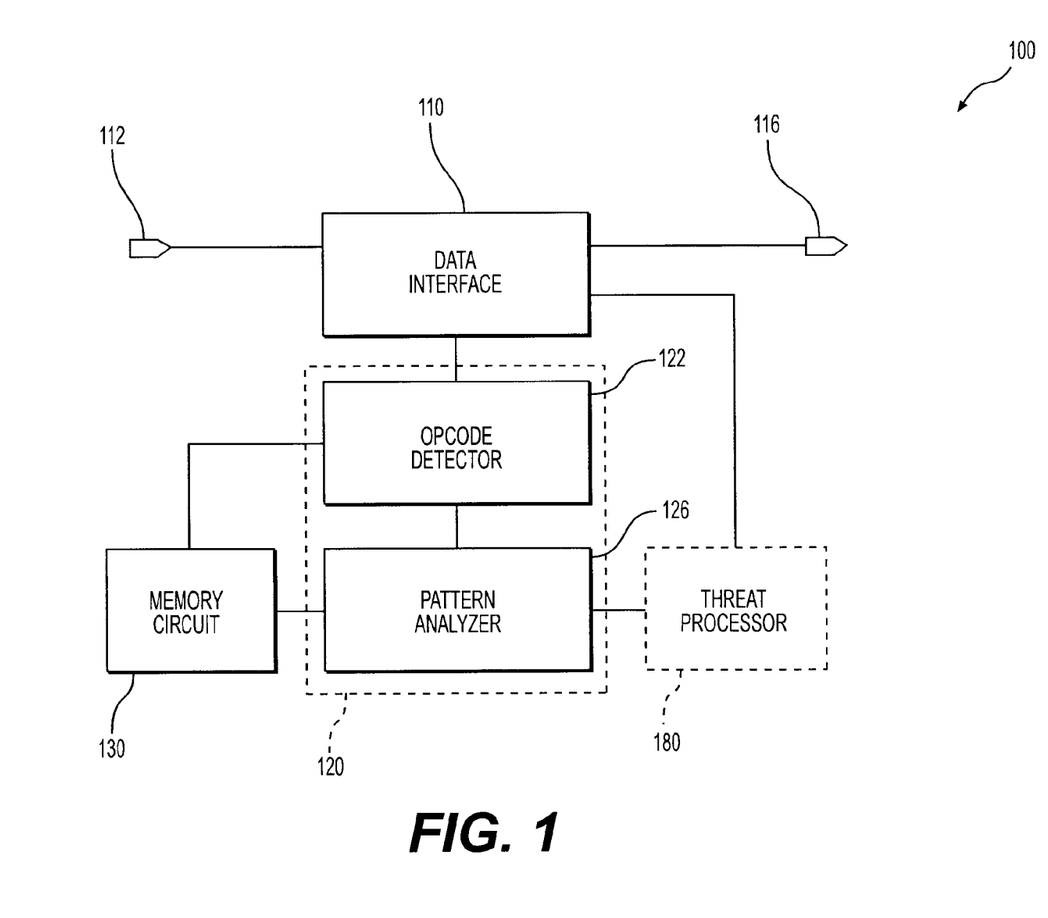
FIG. 1 is a functional block diagram of an example threat detecting apparatus 100 coupled with a threat processor 180 according to an embodiment of the disclosure.

FIG. 1 is a functional block diagram of an example threat detecting apparatus 100 coupled with a threat processor 180 according to an embodiment of the disclosure. As shown, the threat detecting apparatus 100 can include a data interface 110, a threat detecting processor 120 coupled with the data interface 110, and a memory circuit 130 coupled with the threat detecting processor 120. The data interface 110 is coupled with a data input port 112 and a data output port 116.

The threat detecting processor 120 can include an opcode detector 122 coupled with the data interface 110 and a pattern analyzer 126 coupled with the opcode detector 122. The opcode detector 122 and the pattern analyzer 126 are coupled with the memory circuit 130. A threat processor 180, which is external to the threat detecting apparatus 100, can be coupled with both the data interface 110 and the threat detecting circuit 120.

The data interface 110 is configured to receive a data stream from a data network or a computer or other data source (for example, a hard drive, a USB drive, etc.) via the data input port 112. The data interface 110 is also configured to output the data stream to the threat detecting processor 120 and to another data network or another computer via the data output port 116. The data interface 110 can include a wireless network interface, such as BLUETOOTH, WIFI, WIMAX, LTE, GPRS, or WCDMA; or wired network interface such as ETHERNET, USB, or IEEE-1394.

The threat detecting processor 120 is configured to receive the data stream and to determine whether a threat is embedded in the received data stream. In order for a threat to affect a target machine, the threat may still need to cause the processor of the target machine to perform one or more operations that have detrimental effects to the target machine. Therefore, the threat detecting processor 120 detects the threat by identifying an opcode sequence embedded in the received data stream and determining whether the identified opcode sequence, to a statistic significant level of confidence, corresponds to a behavioral pattern of a threat. The threat detecting processor 120 is thus capable of identifying a threat whose binary signature has not been seen before.

The opcode detector 122 is configured to identify an opcode sequence embedded in the data stream. The pattern analyzer 126 is configured to identify an opcode signature embedded in the identified opcode sequence, where the opcode signature corresponds to a known detrimental behavior, in other words a threat. The pattern analyzer 126 is further configured to output an indication signal indicative of the successful identification of the threat. Therefore, the threat detecting processor 120 can look for statistically-significant indications of a machine code or a sequence of machine codes in the data stream by detecting an opcode sequence embedded in the data stream and an opcode signature embedded in the opcode sequence. Once such an indication has been identified to a pre-determined level of confidence, the threat detecting processor 120 reports an analysis result to the threat processor 180.

The memory circuit 130 is configured to store at least a portion of the model graph used by the opcode detector 122 or at least a portion of the model graph used by the pattern analyzer 126. In another embodiment, the model graph used by the opcode detector 122 or the model graph used by the pattern analyzer 126 is hard-wired in the threat detecting processor 120. The memory circuit 130 may store intermediate data generated by the opcode detector 122 or the pattern analyzer 126 while the opcode detector 122 or the pattern analyzer 126 is analyzing the data stream. In some embodiments, memory circuit 130 is configured to store a set of instructions causing a processor to function as the opcode detector 122 or the pattern analyzer 126.

The threat processor 180 is configured to receive the analysis result from the threat detecting processor 120 and to take action accordingly to handle the detected threat. In some embodiments, a proper action in response to a detected threat includes causing the data interface 110 to delete or quarantine the infected file, causing the data interface 110 to stop outputting the data stream to the output port 116, continuing receiving the data stream after the threat is detected for further analysis, or performing another threat detecting/scanning operation to verify whether the detected threat is a false alarm. While threat processor 180 is not shown as part of the threat detecting apparatus 100 in FIG. 1, it should be understood that in other embodiments the threat processor 180 may be implemented as part of the threat detecting apparatus 100.

Detailed operations of the threat detecting apparatus 100 will be further described with reference to FIGS. 2-6.

Figure 2:
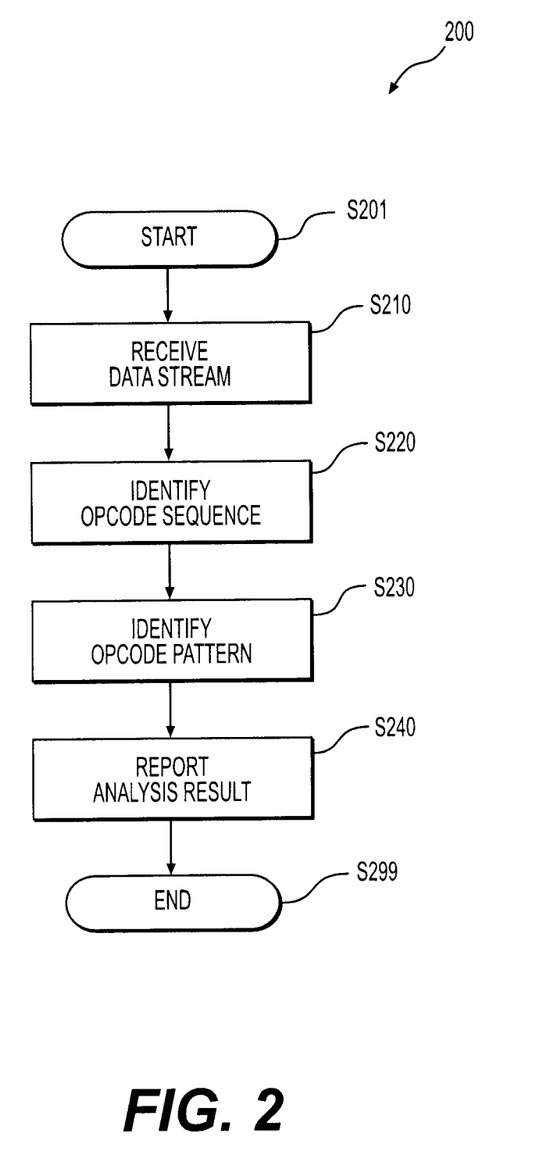
FIG. 2 is a flow chart outlining a process example 200 for detecting a threat according to an embodiment of the disclosure.

FIG. 2 is a flow chart outlining a process example 200 for detecting a threat according to an embodiment of the disclosure. In an example, the process 200 is executed by a threat detecting apparatus, such as the threat detecting apparatus 100. The process begins at S201 and proceeds to S210.

At S210, a data stream is received. For example, the threat detecting apparatus 100 receives the data stream via the data input port 112 of the data interface 110. The data interface 110 then transmits the received data stream to the opcode detector 122.

At S220, opcode sequences are identified in the data stream. As described above, the opcode detector 122 can determine the existence of opcode sequences. Based on a first model graph the opcode detector 122 can determine the existence of opcode sequences embedded in the data stream.

The first model graph includes a plurality of interconnected preamble nodes and token nodes. Each preamble node is a predetermined combination of tokens. Each token node is representative of an occurrence or a non-occurrence of a corresponding token. Each token corresponds to a predetermined combination of bits or bytes. For example, each token may be an 8-bit token, 16-bit token, or a 32-bit token. By dividing the data stream into tokens and traversing the first model graph, based on the tokens of the data stream, from a preamble node to an end node, the existence of a corresponding opcode can be identified. In an example, at S220, at least a portion of the first model graph is retrieved from a memory circuit, such as the memory circuit 130.

In some examples, the received data stream may have various byte alignments or data structure alignments, and an opcode thus may begin at any position in the received data stream. To account for the various possible byte alignments or data structure alignments, the opcode detector 122 can be a multi-hypothesis classifier that is usable to consider all possible variations in a single pass of the data stream. For example, when the received data stream includes data bytes, in the chronological order, $XX_1$, $XX_2$, $XX_3$, $XX_4$, $XX_5$ . . . . Because of various possible byte alignments, each byte of the received data stream could be the beginning of an opcode. As such, the opcode detector 122 may be implemented to process the received data stream with multiple hypotheses that each data byte $XX_1$, $XX_2$, $XX_3$, $XX_4$, $XX_5$ could be the starting point of a respective opcode.

In one embodiment, the opcode detector 122 may be configured to traverse the first model graph using N process threads based on N respective byte alignments, where N is an integer greater than one. For example, when the data stream $XX_1$, $XX_2$, $XX_3$, $XX_4$, and $XX_5$ has five possible byte alignments that each byte could be the first byte of an opcode, the opcode detector 122 can traverse the first model graph using five process threads each begins with a respective data byte $XX_1$, $XX_2$, $XX_3$, $XX_4$, and $XX_5$ as the first byte. In an embodiment, the N process threads can be executed in parallel.

In another embodiment, the opcode detector 122 may also be configured to traverse the first model graph in a single process thread based on the data stream, and the first model graph is constructed to incorporate redundant paths based on the N possible byte alignments of the data stream. In some embodiments, opcode detector 122 may be configured to traverse the first model graph using multiple process threads based on the $N_1$ possible byte alignment variations, and first model graph for each process thread is constructed to incorporate redundant paths based on the $N_2$ possible byte alignment variations of the data stream. Accordingly, in this example, $N_1 \times N_2$ possible byte alignments of the received data stream are accounted for.

Detailed description for S220 is further described with reference to FIGS. 3 and 4.

At S230, an opcode pattern is identified. For example, the pattern analyzer 126 can determine the existence an opcode signature embedded in the identified opcode sequence and identify the opcode signature based on a second model graph. The second model graph includes a plurality of interconnected opcode nodes, and each opcode node of the interconnected opcode nodes is representative of an occurrence or a non-occurrence of a predetermined combination of one or more opcodes. By traversing the second model graph, based on the opcodes in the identified opcode sequence, from a starting node to an end node, the existence of a corresponding threat can be identified.

In some embodiments, the pattern analyzer 126 is a state classifier that is usable to identify a threat having a behavioral signature by traversing the second model graph. An example state classifier is described in U.S. patent application Ser. No. 13/617,879, the disclosure of which in incorporated herein by reference in its entirety. The second model graph may be constructed to reflect a predetermined confidence level that a threat identified by the pattern analyzer 126 is not a false alarm. In an example, at least a portion of the second model graph is retrieved from the memory circuit 130.

Detailed description for S230 is further described with reference to FIGS. 5 and 6.

At S240, the analysis result is reported. To do so, the pattern analyzer 126 can output an analysis result, such as an indication signal indicative of the successful identification of a threat, to the threat processor. Then the process proceeds to S299 and terminates.

Figure 3:
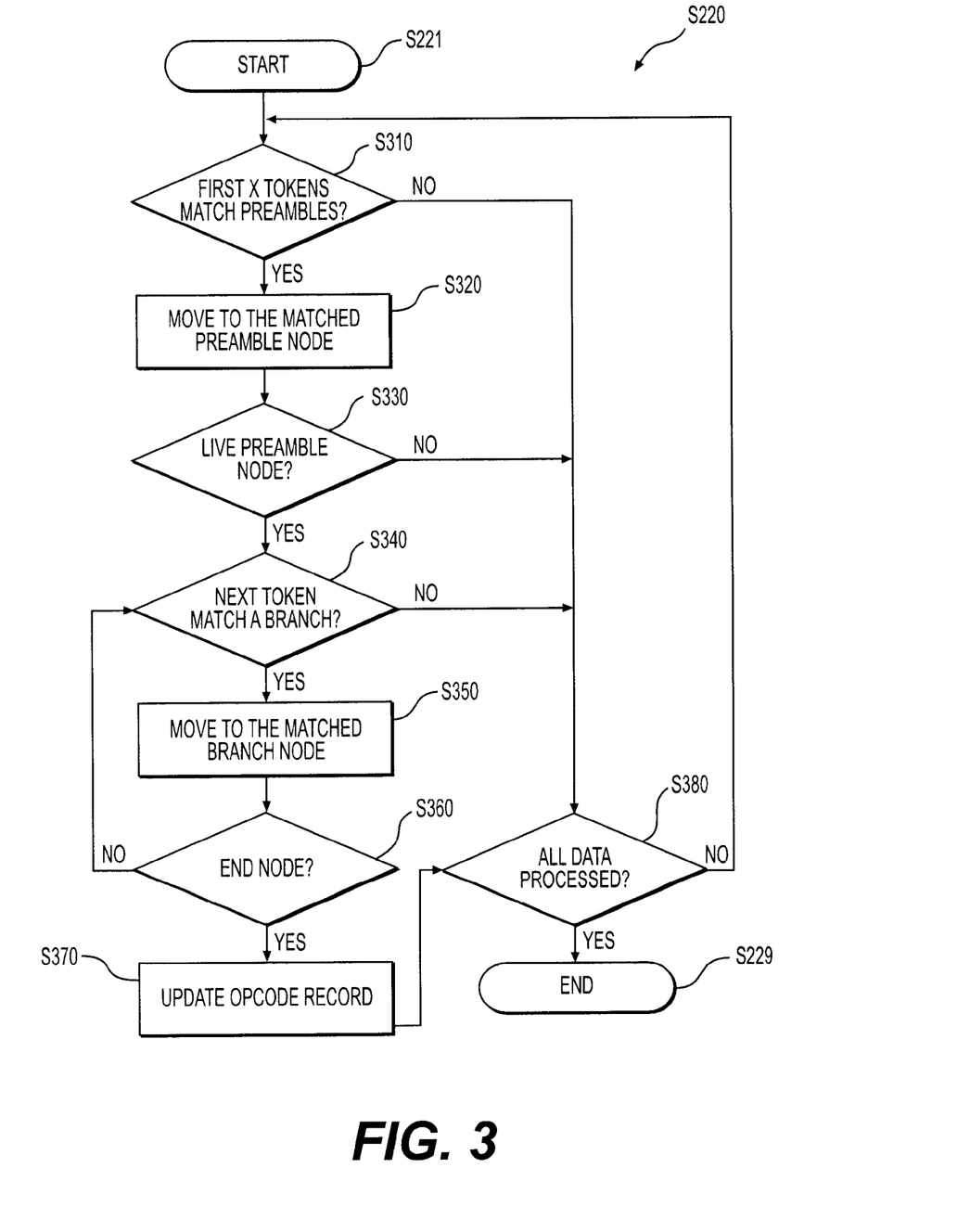
FIG. 3 is a flow chart outlining a more detailed exemplary process for identifying an opcode sequence as described in process step S220 according to an embodiment of the disclosure.

FIG. 3 is a flow chart outlining a more detailed exemplary process for identifying an opcode sequence, as described above in process step S220 in FIG. 2. In some embodiments, at step S220, multiple parallel processing threads may be executed for various possible byte alignments. The process described in step S220 can be executed by an opcode detector, such as the opcode detector 122. In FIG. 3, the process begins at S221 and proceeds to S310.

At S310, the first X tokens of the data stream are extracted, and a determination is made as to whether the first X tokens match one of the plurality of preamble nodes in the first model graph. X is an integer greater than one. For example, the opcode detector 122 can extract the first X tokens of the data stream based on a predetermined byte alignment setting. The opcode detector 122 compares the first X tokens with a plurality of preamble nodes in the first model graph and identifies a matched one of the plurality of preamble nodes. If a match is determined to exist, then the process proceeds to S320; otherwise the process proceeds to step S380.

At S320, a pointer used to trace the traversal of the first model graph is set to be indicative of the matched preamble node. In this disclosure, setting the pointer to be indicative of a particular node in a model graph is also described as moving the pointer to the particular node. The node that pointer points at is also referred to as a current node in the present disclosure. In this step, the opcode detector 122 can move the pointer to the matched preamble node. Other approaches to trace the traversal of the first model graph are within various contemplated embodiments of the present disclosure.

At S330, a determination is made as to whether the matched preamble node is a live preamble node that has one or more token nodes connected thereto. When the matched preamble node is a live preamble node, the process proceeds to S340. When the matched preamble node is not a live preamble node, the first X tokens do not lead to any opcode detectable according to the first model graph, and the process proceeds to S380. In this step, the opcode detector 122 can determine whether the matched preamble node is a live preamble node.

At S340, a next token of the data stream that has not yet being referenced for traversing the first model graph is extracted, and a determination is made as to whether the next token matches a branch token node connected to the current node in the first model graph. For example, the opcode detector 122 may extract a next token of the data stream. When the pointer is at the matched preamble node, the next token is a token immediately after the first X tokens. The opcode detector 122 may compare the next token with one or more branch token nodes connected to the matched preamble node. When the pointer is at a token node, the next token is a token immediately subsequent to the previous referenced token. If a match is determined to exist, then the process proceeds to S350; otherwise the process proceeds to step S380.

At S350, the pointer used to trace the traversal of the first model graph is moved to the matched token node. For example, the opcode detector 122 can move the pointer to the matched branch token node.

At S360, a determination is made as to whether the current node is an end node such that the combination of tokens along the path the pointer has traced corresponds to a predetermined opcode. For example, the opcode detector 122 can determine whether the current node is an end node. When the current node is an end node, the process proceeds to S370. When the current node is not an end node, the combination of tokens along the path is not sufficient to support a conclusion that a predetermined opcode has been identified, and the process proceeds to S340 to continue traversing the first model graph based on the remaining portion of the data stream that has not yet being referenced for traversing the model graph.

From S310 to S360, the pointer has been moved to traverse the model graph starting from a matched one of the plurality of preamble node, various branch token nodes based on the other tokens of the data stream in a sequential order, to an end node.

At S370, an opcode sequence record is updated to include an opcode corresponding to the end node at which the pointer currently is. For example, the opcode detector 122 can update an opcode sequence record based on the opcode corresponding to the end node. In an embodiment, the opcode detector 122 is a multi-hypothesis classifier implemented by executing N parallel process threads for N different byte alignments or data structure arrangements. The first model graph may be constructed such that if at S360 an invalid opcode is identified, the corresponding byte alignment or data structure arrangement is determined to be not applicable to the received data steam, and the respective process thread is thus terminated at S370.

At S380, a determination is made as to whether all tokens in the data stream have been referenced for traversing the model graph. For example, the opcode detector 122 may determine whether all tokens in the data stream that have been processed. When all tokens in the data stream have been referenced to traverse the model graph, the process proceeds to S229. When there are some tokens in the data stream that have not been referenced to traverse the model graph, the opcode detector 122 can discard the processed tokens in the data stream and return to S310 to move the pointer to traverse the model graph again based on the remaining tokens of the data stream in a sequential order. In another embodiment, at S380, the opcode detector 122 concludes the analysis of the data stream and proceeds to S229 without traversing the model graph for a second round.

The process terminates at S229.

In some embodiments, the opcode detector 122 can be configured to process the data stream in a single pass without backing up. The opcode detector 122 may use a well-developed model graph with built-in redundant paths to exhaust all possible variations of opcodes of interest and all possible byte alignments or data structure alignments. Meanwhile, the opcode detector 122 may identify a possible opcode by performing a series of relatively simple memory comparison operations. Although such well-developed model graph may occupy a relatively large storage space, the well-developed model graph may also simplify the computational complexity and improve the processing speed such that the received data stream can be processed in a single pass.

Figure 4:
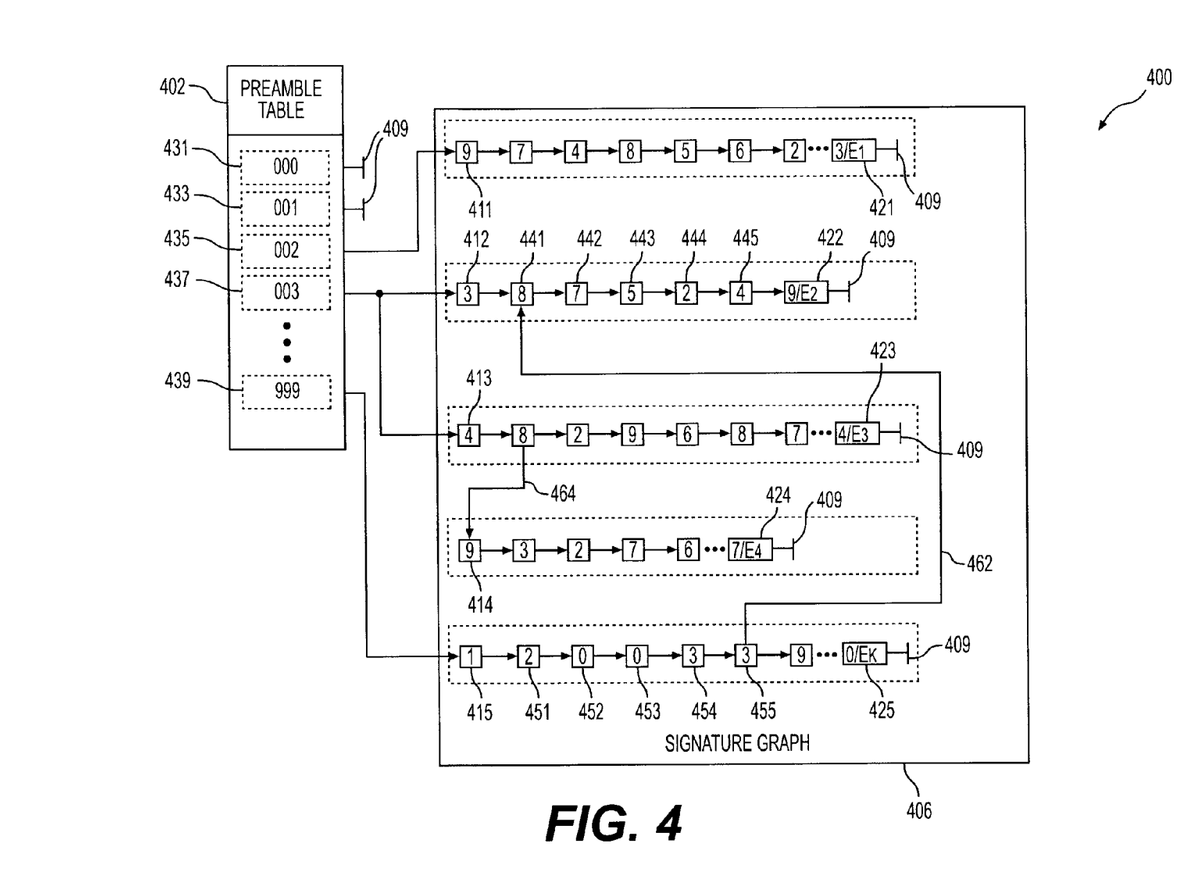
FIG. 4 is a graph diagram of an exemplary model graph 400 for identifying an opcode sequence according to an embodiment of the disclosure.

FIG. 4 is a graph diagram of an exemplary model graph 400 for detecting an opcode sequence according to an embodiment of the disclosure. The model graph 400 is usable as the first model graph used in conjunction with the process step S220 in FIG. 3.

The model graph 400 includes a preamble table 402 and a signature graph 406. The preamble table 402 includes a plurality of preamble nodes each corresponding to a combination of three tokens. The signature graph 406 includes a plurality of token nodes each is indicative of presence of a predetermined token. Some of the token nodes 411-415 are connected to corresponding preamble nodes in the preamble table 402. Some of the token nodes 421-425 are end nodes ($E_1$~$E_k$) that correspond to identification of various opcodes. Each of the token nodes 421-425 are depicted with a null pointing symbol 409 indicating the termination of a current process for traversing the model graph. Accordingly, a combination of tokens along each path from a preamble node to an end node corresponds to successful identification of an opcode. In at least one example, the model graph 400 has built-in redundancy paths that may lead to the same end node in order to take different byte alignments or placeholder tokens into consideration. In some examples, the redundancy paths are implemented by splice paths 462 and 464 that connect one set of serially-linked token nodes to another set of serially-linked token nodes.

Each token can have any one of "t" possible values. For illustration purposes, in the example in FIG. 4, the tokens are described as decimal digits, where there are t=10 possible values for each token. Those skilled in the art will understand that tokens having a different number of possible values may also be used. Each preamble node includes three tokens, and the preamble table thus includes up to $10^3$ different preamble nodes. In this example, preambles 431 and 433 are not live preamble nodes because the process for traversing the model graph 400 ends at the preamble node as indicated by the null pointing symbols 409. Preambles 431, 434, and 436 are live preamble nodes that lead to different end nodes through various paths.

In the example in FIG. 4, an opcode is composed of tokens "0033875249" is to be identified in two different scenarios.

In a first scenario, the data stream having tokens "0033875249 . . . " is to be analyzed. The opcode detector 122 first extracts the first three tokens "003" and finds a matched preamble node 437 in the preamble table 402 (S310 and S320). Because the preamble node 437 is a live preamble node, the opcode detector 122 moves on to extract a next token "3" and finds a matched token node 412 (steps S330 and S340). The opcode detector 122 performs steps S340 to S360 recursively based on the remaining portion of the data stream "875249 . . . " to move a pointer to traverse through token nodes 441, 442, 443, 444, and 445, and to token node 422. The token node 422 is an end node $E_2$ that corresponds to the opcode "0033875249," and the opcode detector 122 updates an opcode sequence record to include the identified opcode "0033875249" (step S370). The opcode detector 122 then discards the processed tokens "0033875249" from the data stream and traverse the model graph 400 again based on the remaining portion of the data stream.

In a second scenario, the data stream having tokens "999120033875249 . . . " is to be analyzed. The opcode detector 122 first extracts the first three tokens "999" and finds a matched preamble node 439 in the preamble table 402 (steps S310 and S320). Because the preamble node 439 is a live preamble node, the opcode detector 122 moves on to extract a next token "1" and finds a matched token node 415 (steps S330 and S340). The opcode detector 122 performs steps S340 and S360 recursively based on the remaining portion of the data stream "120033 . . . " to move a pointer to traverse through token nodes 451, 452, 453, 454, and to token node 455. The next token "8" leads the pointer to be moved to token node 441 through a splice path 462. The opcode detector 122 continues performing steps S340 and S360 recursively based on the remaining portion of the data stream "75249 . . . " to move the pointer to traverse through token nodes 442, 443, 444, and 445, and to token node 422. The token node 422 is an end node $E_2$ that corresponds to the opcode "0033875249," and the opcode detector 122 updates an opcode sequence record to include the identified opcode "0033875249" (step S370). The opcode detector 122 then discards the processed tokens "0033875249" from the data stream and traverse the model graph 400 again from the preamble table 402 based on the remaining portion of the data stream.

As demonstrated by the first scenario and the second scenario, various possible byte alignments have been accounted for using multiple hypotheses in the model graph 400. As such, even without the knowledge of the exact byte alignment of the received data stream, the analysis thereof can still be processed in a single pass without backing up or rearranging the data stream for a second pass. Also, in some embodiments, the overall size of the model graph 400 can be reduced by merging various possible token sequences with the introduction of the splice paths.

The model graph 400 and the examples illustrated above are non-limiting examples. Other model graph configuration and arrangement of interconnected opcode nodes are within various embodiments of the present disclosure.

Figure 5:
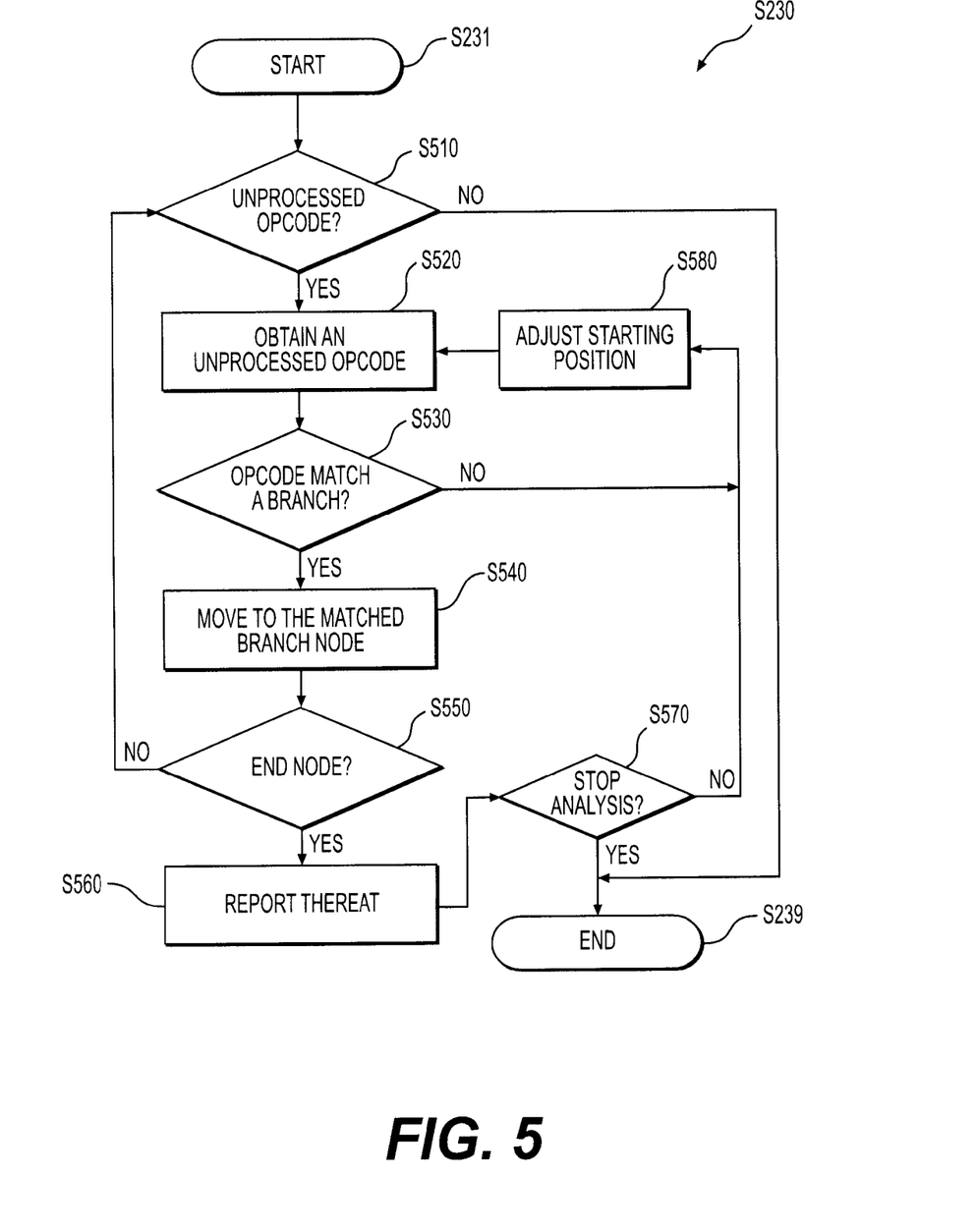
FIG. 5 is a flow chart outlining a more detailed exemplary process for identifying an opcode pattern as described in process step S230 according to an embodiment of the disclosure.

FIG. 5 is a flow chart outlining a more detailed exemplary process for analyzing an opcode pattern as described in process step S230 according to an embodiment of the disclosure. The process S230 is an example processing thread for implementing step S230 described above in FIG. 2. In an example, the process S230 can be executed by a pattern analyzer, such as the pattern analyzer 126 and the like. The process begins at 5231 and proceeds to S510.

At S510, a determination is made as to whether there is at least one unprocessed opcode. To do this, the pattern analyzer 126 may determine whether there is at least one unprocessed opcode in the identified opcode sequence, or whether the opcode detector 122 did not identify any opcode from the data stream. When the opcode detector 122 successfully identified an opcode sequence and the pattern analyzer 126 is processing the first opcode in the identified opcode sequence, a pointer for traversing a second model graph is set to a starting node of the second model graph. When it is determined that there is at least one unprocessed opcode, the process proceeds to S520. When it is determined that there is no opcode for further analysis, the process proceeds to S239. In some embodiments, the opcode detector 122 traverses the first model graph in multiple process threads and may identify multiple corresponding opcode sequences. Each of the multiple opcode sequences may be processed by the pattern analyzer 126 based on process 230 in separate process threads.

At S520, an unprocessed opcode is obtained for traversing the second model graph. The pattern analyzer 126 can extract a first opcode from the identified opcode sequence from the opcode detector 122 or a first opcode in the identified opcode sequence that has not been referenced for traversing the second model graph.

At S530, a determination is made as to whether there is a branch opcode node connected to the current node at which the pointer is that matches the obtained opcode. Here, the pattern analyzer 126 may determine whether a matched branch opcode node exists. When a matched branch opcode node exists, the process proceeds to S540. When no matched branch opcode node exists, the process proceeds to S580.

At S540, the pointer is moved to the matched branch opcode node. For example, the pattern analyzer 126 moves the pointer to the matched branch opcode node.

At S550, a determination is made as to whether the current opcode node is an end node such that the combination of opcodes along the path the pointer has traversed corresponds to a predetermined threat. For example, the pattern analyzer 126 can determine whether the current branch opcode node is an end node. When the current branch opcode node is an end node, the process proceeds to S560. When the current branch opcode node is not an end node, the combination of opcodes along the path is not sufficient to support a conclusion that a predetermined threat has been identified, and the process proceeds to S510 to continue traversing the second model graph based on the remaining portion of the opcode sequence that has not yet being referenced for traversing the second model graph.

From S510 to S550, the pointer has been moved to traverse the model graph from the starting node based on the opcodes in the identified opcode sequence in a sequential order to an end node.

Depending on the types of threats to be detected and the predetermined confidence level of the detection result, a successful traversal of the second model graph may be indicative of the quantity, nature, or a combination of the quantity and nature of one or more opcodes that is likely to correspond to a threat. In some embodiments, a threat as defined by a successful traversal of the second model graph may include detection of an opcode in a pure data stream, detection of a predetermined number of opcodes in a pure data stream, detection of an opcode corresponding to entering a protective mode, detection of a jump opcode, detection of a branch opcode, or detection of a no operation (NOP) opcode. In some embodiments, a threat as defined by a successful traversal of the second model graph may include a particular sequence of opcodes that corresponds to a detrimental behavior pattern.

In at least one example, prior to S510, the identified sequence of opcodes is checked for existence of jump opcodes, branch opcodes, or placeholder opcodes. The identified sequence of opcodes may be reordered according to the jump opcodes, branch opcodes, or placeholder opcodes for further analysis based on S510 to S550.

At S560, the identification of the threat is reported. In an example, the pattern analyzer 126 reports the identification of the threat corresponding to the end node at which the pointer currently is.

At S570, a determination is made as to whether to stop the analysis, The analysis may be stopped because all opcodes in the identified opcode sequence have been processed, or because there is no need to continue analyzing the data stream after a threat is detected and reported. For example, the pattern analyzer 126 determines whether to stop the analysis of the remaining unprocessed opcode(s). When it is determined to continue analyzing the remaining unprocessed opcode(s), the process proceeds to S580. When it is determined to stop analyzing the data stream, the process proceeds to S239.

At S580, the pointer is reset to the starting node of the second model graph, and a starting position indicating a first opcode in the identified opcode sequence to be analyzed in the next round of traversing the second model graph is adjusted. The pattern analyzer 126 can reset the pointer and adjust the starting position in the identified opcode sequence for the next round. The pattern analyzer 126 may set the starting position at the first unprocessed opcode in the identified opcode sequence. In one example, the pattern analyzer 126 may set the starting position at a processed opcode in the identified opcode sequence and marks all the subsequent opcodes as unprocessed opcodes.

The process terminates at S239.

Figure 6:
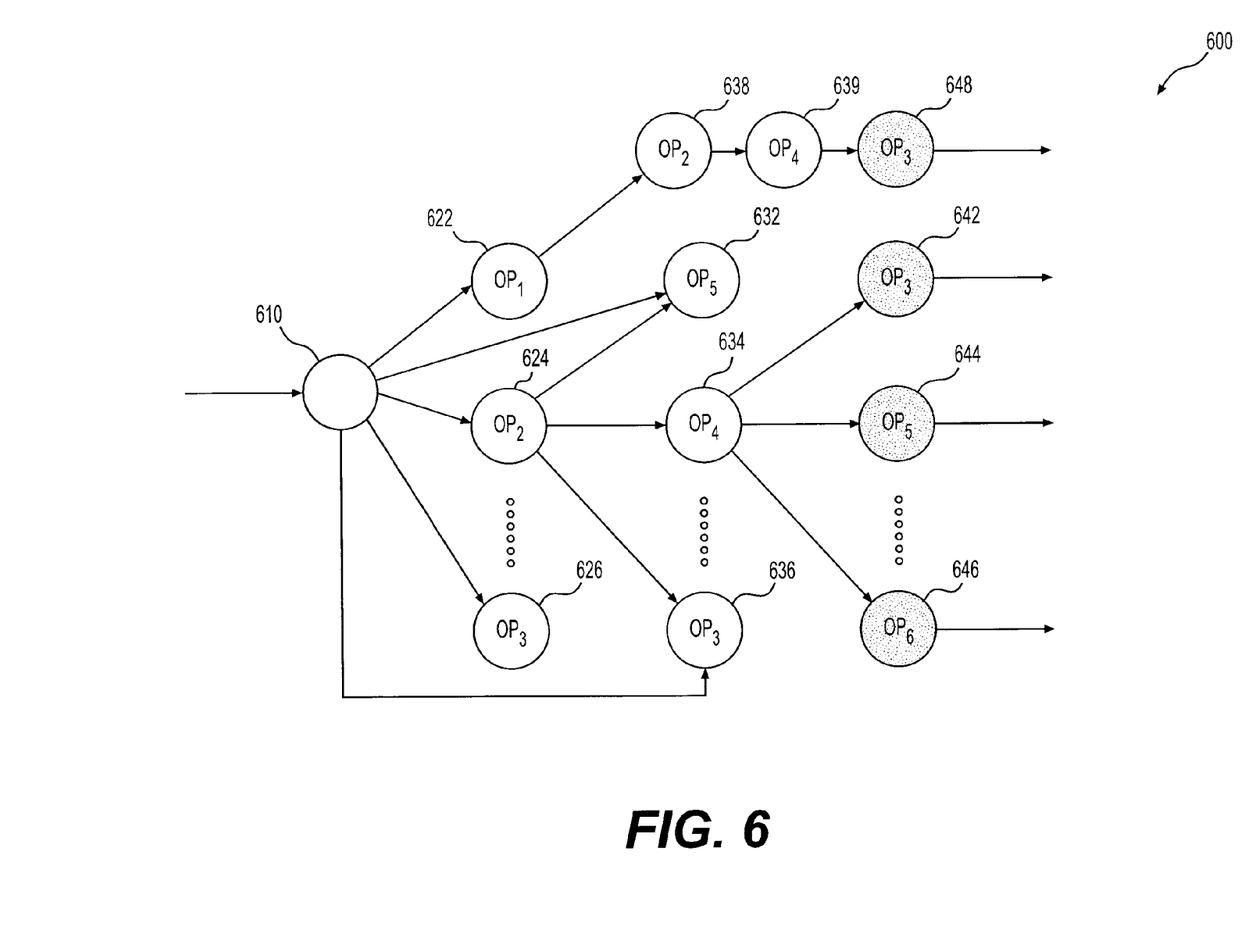
FIG. 6 is a graph diagram of an exemplary model graph 600 for identifying an opcode pattern according to an embodiment of the disclosure.

FIG. 6 is a graph diagram of an exemplary model graph 600 for analyzing an opcode pattern according to an embodiment of the disclosure. The model graph 600 is usable as the model graph used in conjunction with the process 230 in FIG. 5.

The model graph 600 includes a starting node 610 and a plurality of interconnected opcode nodes 622, 624, 626, 632, 634, 636, 638, 639, 642, 644, 646, and 648. The downstream branch nodes for opcode nodes 626, 632, and 636 are not depicted in FIG. 6. Each opcode node 622-648 is indicative of presence of a predetermined opcode $OP_1$, $OP_2$, $OP_3$, $OP_4$, $OP_5$, or $OP_6$. Opcode nodes 642-648 are end nodes. A combination of opcodes along each path from the starting node 610 to an end node 642-648 corresponds to successful identification of a predetermined threat. In FIG. 6, the presence of opcode $OP_6$ may immediately lead to an end node 646. The opcode $OP_6$ may correspond to an opcode that only an operating system or a manufacture may use to cause the processor to operate in a protective mode or a test mode. Therefore, in this embodiment, the model graph 600 is configured to declare the presence of opcode $OP_6$ in a data stream as a threat.

In at least one example, the model graph 600 has built-in redundancy paths that may lead to the same end node in order to take different placeholder or decoy opcodes into consideration.

In a first example according to FIG. 6, the identified opcode sequence having opcodes "$OP_2$, $OP_4$, $OP_2$, $OP_1$, ... " is to be analyzed. The pattern analyzer 126 first determines that the identified opcode sequence is not an empty sequence (step S510) and extracts the first opcode "$OP_2$" for processing (step S520). The pattern analyzer 126 then finds a matched branch opcode node 624 (step S530) and moves a pointer from the starting node 610 to the opcode node 624. The pattern analyzer 126 determines that opcode node 624 is not an end node (step S550) and thus proceeds to analyze the next opcode. Based on the subsequent opcodes $OP_4$ and $OP_5$, the pattern analyzer 126 sets the pointer to traverse the model graph 600 through opcode node 634 to opcode node 644.

The pattern analyzer 126 determines that opcode node 644 is an end node (step S550) and reports to the threat processor 180 that a threat corresponding to end node 644 has been detected (step S560). The pattern analyzer 126 may decide to analyze the remaining portion of the opcode sequence starting at opcode $OP_1$ or just stop analyzing the opcode.

In a second example according to FIG. 6, the identified opcode sequence having opcodes "$OP_4$, $OP_2$, $OP_4$, $OP_5$, ... " is to be analyzed. The pattern analyzer 126 first determines that the identified opcode sequence is not an empty sequence (step S510) and extracts the first opcode "$OP_4$" for processing (step S520). However, the pattern analyzer 126 cannot find a matched branch opcode node after the starting node 610. The pattern analyzer 126 thus drops the processed opcode "$OP_4$", and continues processing the remaining portion of the opcode sequence "$OP_2$, $OP_4$, $OP_5$, ... " In the second iteration, the pattern analyzer 126 traverses the model graph 600 from starting node 610 to end node 644 through opcode nodes 624 and 634 as illustrated in the first example and reports that a threat corresponding to end node 644 has been detected.

In a third example according to FIG. 6, the identified opcode sequence having opcodes "$OP_1$, $OP_2$, $OP_4$, $OP_5$, ... " is to be analyzed. The pattern analyzer 126 traverses the model graph 600 using opcodes "$OP_1$, $OP_2$, $OP_4$" and then cannot find a matched branch opcode node for opcode "$OP_5$" afterwards. The pattern analyzer 126 then adjusts the starting position to the second opcode "$OP_2$" and traverses the model graph again and identified a threat corresponding to the opcode sequence of "$OP_2$, $OP_4$, $OP_5$" as illustrated in the first example. The pattern analyzer 126 may adjust the starting position by rolling back a predetermined number of opcodes. In an embodiment, the pattern analyzer 126 may adjust the starting position to a predetermined number of opcodes after the previous starting position. In another embodiment, the pattern analyzer 126 may adjust the starting position to a predetermined opcode among the processed opcodes after the previous starting position.

The model graph 600 and the examples illustrated above are non-limiting examples. Other model graph configuration and arrangement of interconnected opcode nodes are within various embodiments of the present disclosure.

Figure 7A:
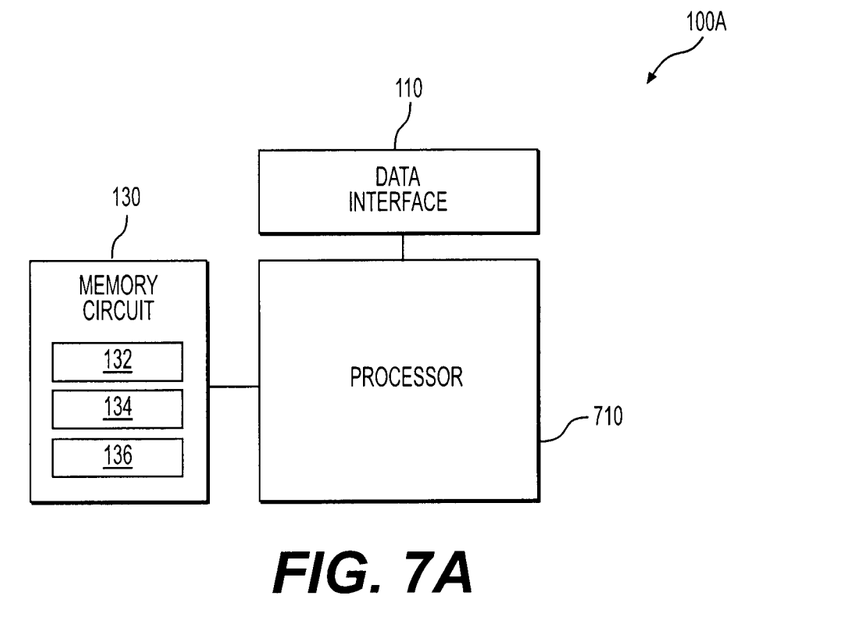
FIG. 7A is a system block diagram of an example threat detecting apparatus 100A according to an embodiment of the disclosure.

FIG. 7A is a system block diagram of an example threat detecting apparatus 100A according to an embodiment of the disclosure. The threat detecting apparatus 100A is an example implementation of the threat detecting apparatus 100 in FIG. 1. Components in FIG. 7A that are the same or similar to the components in FIG. 1 are given the same reference numbers.

The threat detecting apparatus 100A includes a data interface 110, a memory circuit 130, and a processor 710. The memory circuit 130 is configured to store a set of instructions 132, at least a portion of the first model graph or at least a portion of the second model graph 134, and intermediate data 136 for performing the process as illustrated in FIGS. 2, 3, and 5. The processor 710 is configured to execute the set of instructions 132 to function as the opcode detector 122 and the pattern analyzer 126.

In some embodiments, the memory circuit 130 is an electronic, magnetic, optical, electromagnetic, infrared, and/or a semiconductor system (or apparatus or device). For example, the memory circuit 130 may include a semiconductor or solid-state memory, a magnetic tape, a removable computer diskette, a random access memory (RAM), a read-only memory (ROM), a rigid magnetic disk, and/or an optical disk. In some embodiments, the processor 710 is a central processing unit (CPU), a multi-processor, a distributed processing system, and/or a suitable processing unit.

Figure 7B:
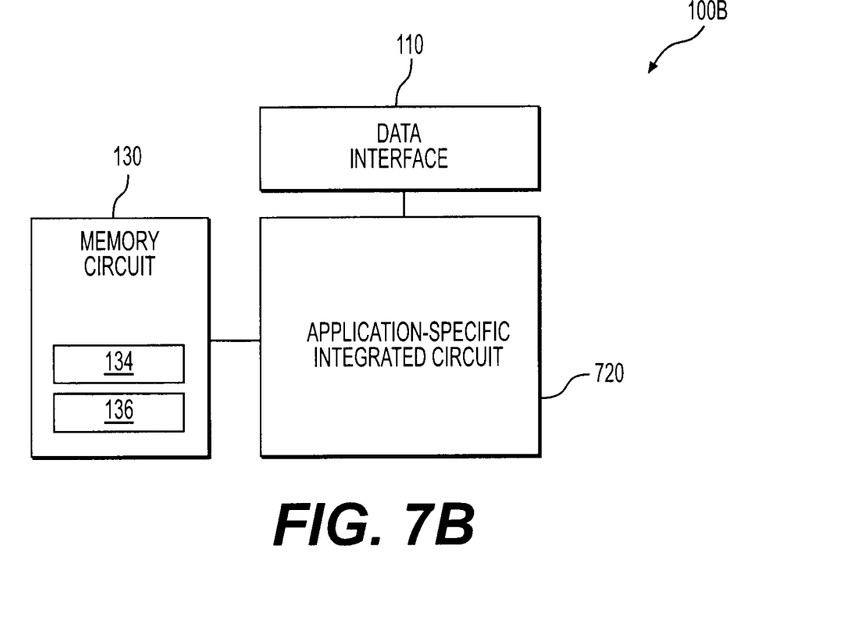
FIG. 7B is a system block diagram of another example threat detecting apparatus 100B according to an embodiment of the disclosure.

FIG. 7B is a system block diagram of another example threat detecting apparatus 100B according to an embodiment of the disclosure. The threat detecting apparatus 100B is another example implementation of the threat detecting apparatus 100 in FIG. 1. Components in FIG. 7A that are the same or similar to the components in FIG. 7A are given the same reference numbers.

The threat detecting apparatus 100B includes a data interface 110, a memory circuit 130, and an application specific integrated circuit (ASIC) 720. The memory circuit 130 is configured to store at least a portion of the first model graph or at least a portion of the second model graph 134 and intermediate data 136 for performing the process as illustrated in FIGS. 2, 3, and 5. The ASIC 720 is configured to function as the opcode detector 122 and the pattern analyzer 126. In one example, at least a portion of the first model graph or a portion of the second model graph may be hard-wired in the ASIC 720.

In at least one example, the threat detecting apparatus 100 is implemented by a combination of the processor 710 and the ASIC 720.

Figure 8:
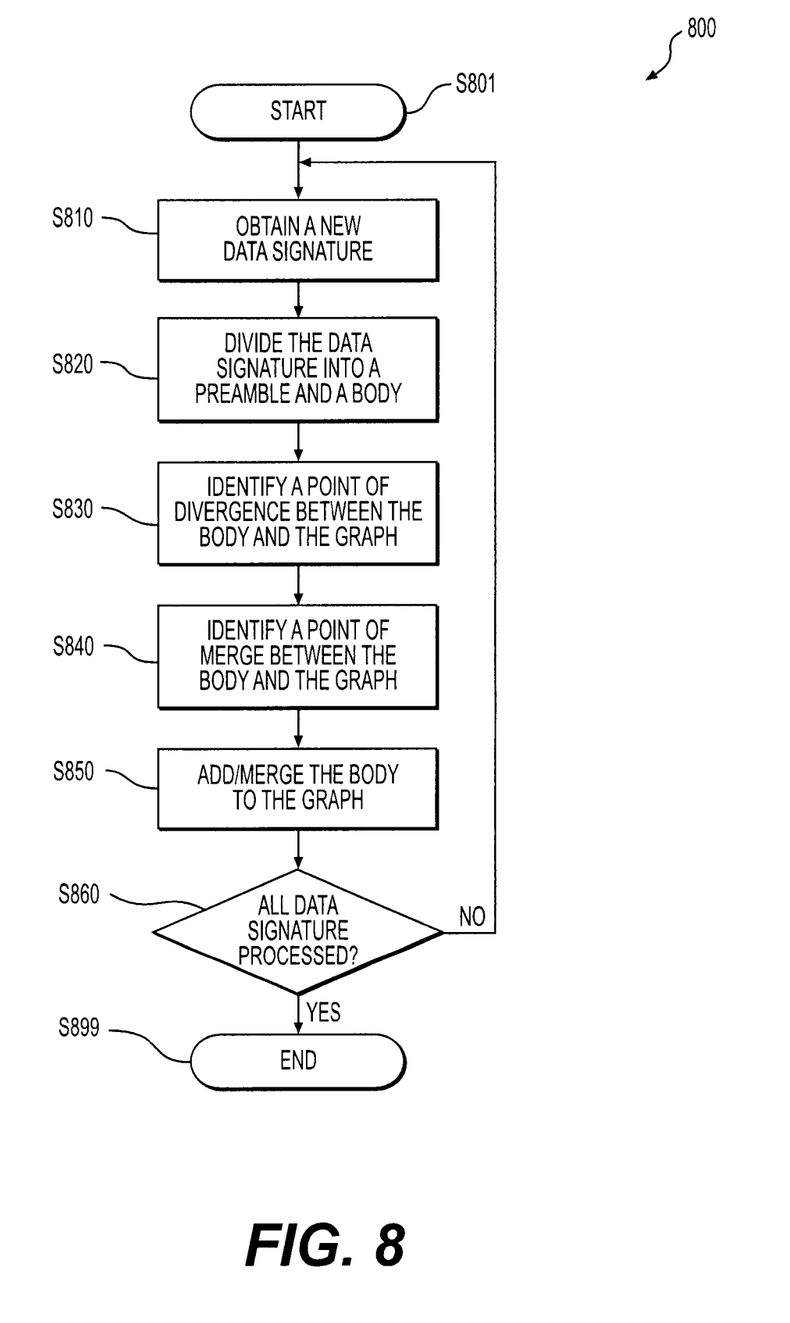
FIG. 8 is a flow chart outlining a process example 800 for generating a model graph 400 for detecting an opcode sequence according to an embodiment of the disclosure.

FIG. 8 is a flow chart outlining an exemplary process 800 for generating a model graph, such as the model graph 400, for detecting an opcode sequence according to an embodiment of the disclosure. The model graph 400 depicted in FIG. 4 will be referenced as a non-limiting example. In an example, the process 800 is executed by a threat detecting apparatus, such as the threat detecting apparatus 100 and the like. In another example, the process 800 is executed by a computer. The process begins at S801 and proceeds to S810.

At S810, a new data signature that corresponds to a known opcode is obtained. The obtained data signature is in the form of a token string. The obtained data signature may include only the opcode itself or variations of the opcode under different byte alignments.

At S820, the data signature is divided into a preamble and a body. For example, as depicted in FIG. 4, a data signature having a token string "0033875249" may be divided into a preamble "003" (preamble 437) and a body "3875249" (token nodes 412, 441-445, and 422).

At S830, a point of divergence between the body and the graph is identified. For example, when the preamble node corresponding to the preamble of the data signature has not yet connected to any token node, the point of divergence is at the preamble node. In another example, after a data signature having a token string "9991200339 . . . " is added to the model graph 400, a point of divergence of a data signature having a token string "999120033875249" is at token node 455.

At S840, a point of merge between the body and the graph after the point of divergence is identified. In some embodiments, the point of merge is identified by comparing the data signatures that are variations of the same opcode. For example, after a data signature having a token string "9991200339 . . . " and a data signature having a token string "0033875249" are added to the model graph 400, a point of merge of a data signature having a token string "999120033875249" is at token node 441. In some examples, there may not be an identifiable point of merge.

At S850, the body of the data signature is added or merged to the model graph 400 based on the identified point of divergence or point of merge. In the example discussed above, after a data signature having a token string "9991200339 . . . " and a data signature having a token string "0033875249" are added to the model graph 400, a point of divergence and a point of merge of a data signature having a token string "999120033875249" is at token node 455 and token node 441, respectively. To add or merge token string "999120033875249" to model graph 400, a splice path 462 is established pointing from token node 455 to token node 441. In one embodiment when there is no identifiable point of merge, the token nodes corresponding to the tokens after the point of divergence are established and linked according to the order of the token string.

At S860, a determination is made as to whether there is another data signature to be processed and added to model graph 400. When there is no other data signature to be included in model graph 400, the process proceeds to S899 and terminates. When there is at least one new data signature to be included in model graph 400, the process proceeds to S810.

Figure 9:
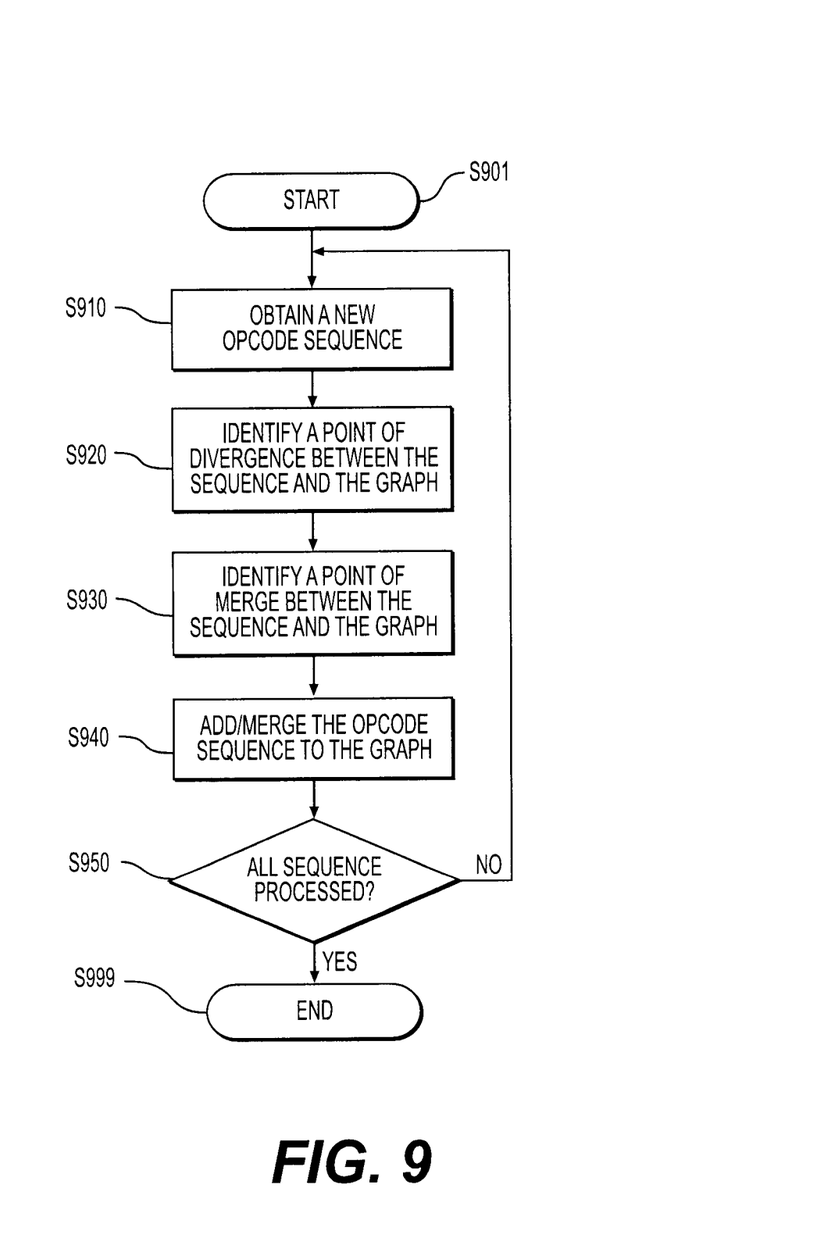
FIG. 9 is a flow chart outlining a process example 900 for generating a model graph 600 for analyzing an opcode pattern according to an embodiment of the disclosure.

FIG. 9 is a flow chart outlining an exemplary process 900 for generating a model graph, such as the model graph 600, for analyzing an opcode pattern according to an embodiment of the disclosure. The model graph 600 depicted in FIG. 6 will be referenced as a non-limiting example. In an example, the process 900 is executed by a threat detecting apparatus, such as the threat detecting apparatus 100 and the like. In another example, the process 900 is executed by a computer. The process begins at S901 and proceeds to S910.

At S910, a new opcode sequence that corresponds to a known threat is obtained. The obtained opcode sequence may include only the minimum number of opcodes sufficient to identify the known threat or opcode sequence variations of the known threat having different decoy or redundant opcodes inserted therein.

At S920, a point of divergence between the opcode sequence and the graph is identified. For example, when the starting node 610 has not yet connected to any opcode node, the point of divergence is at the starting node. In another example, after an opcode sequence "$OP_2$, $OP_5$, . . . " is added to the model graph 600, a point of divergence of an opcode sequence "$OP_2$, $OP_4$, $OP_5$" is at opcode node 624.

At S930, a point of merge between the opcode sequence and the graph after the point of divergence is identified. In some embodiments, the point of merge is identified by comparing the opcode sequences that are variations of the same threat. In some examples, there may not be an identifiable point of merge.

At S940, the opcode sequence is added or merged to the model graph 600 based on the identified point of divergence or point of merge. In one embodiment when there is no identifiable point of merge, the opcode nodes corresponding to the opcodes after the point of divergence are established and linked according to the order of the opcode sequence.

At S950, a determination is made as to whether there is another opcode sequence to be processed and added to model graph 600. When there is no other opcode sequence to be included in model graph 600, the process proceeds to S999 and terminates. When there is at least one new opcode sequence to be included in model graph 600, the process proceeds to S910.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A threat detecting apparatus, comprising:
an interface circuit configured to receive a data stream;
an opcode detector implemented by hardware circuitry and configured to identify an opcode sequence embedded in the data stream based on a first model graph, the first model graph including a plurality of interconnected token nodes, each token node of the plurality of interconnected token nodes being representative of an occurrence or a non-occurrence of a token, and each token being a predetermined combination of bits or bytes; and
a pattern analyzer implemented by the hardware circuitry and configured to identify an opcode signature embedded in an identified opcode sequence embedded in the data stream based on a second model graph, and to output a signal indicative of a successful identification of the opcode signature embedded in the identified opcode sequence embedded in the data stream based on the second model graph, the second model graph including a plurality of interconnected opcode nodes, each opcode node of the plurality of interconnected opcode nodes being representative of an occurrence or a non-occurrence of a predetermined combination of one or more opcodes,
wherein the opcode detector is configured to identify the opcode sequence embedded in the data stream based on the first model graph comprises traversing the first model graph in N process threads based on the data stream and N different byte alignments, or by traversing the first model graph, which incorporates redundant paths based on the N possible byte alignments of the data stream, in one process thread based on the data stream, wherein the N is an integer greater than one;
wherein the opcode detector is configured to identify a matched one of a plurality of preamble nodes in the first model graph that matches first X tokens of the data stream, wherein the X being an integer greater than one; move a pointer to traverse the first model graph starting from the matched one of the plurality of preamble nodes based on other tokens of the data stream in a sequential order; and when the pointer reaches an end node of the first model graph, update an opcode sequence record to include an opcode corresponding to the end node of the first model graph;
wherein the opcode detector is further configured to, after identifying an opcode, discard processed tokens in the data stream and traverse the first model graph based on a remaining portion of the data stream to identify a next opcode in a recursive manner.

2. The threat detecting apparatus of claim 1, wherein the pattern analyzer is configured to identify the opcode signature embedded in the identified opcode sequence based on the second model graph comprises moving a pointer to traverse the second model graph from a starting node of the second model graph based on opcodes of the identified opcode sequence embedded in the data stream in a sequential order; and
when the pointer reaches an end node of the second model graph, report identification of an opcode signature corresponding to the end node of the second model graph.

3. The threat detecting apparatus of claim 1, further comprising:
a memory circuit configured to store at least a portion of the first model graph or at least a portion of the second model graph.

4. The threat detecting apparatus of claim 3, wherein the memory circuit is configured to store a set of instructions, and
the hardware circuitry of the threat detecting apparatus comprises a processor configured to execute the set of instructions to function as the opcode detector or the pattern analyzer.

5. The threat detecting apparatus of claim 1, wherein the hardware circuitry comprises:
an application-specific integrated circuit (ASIC) configured to function as the opcode detector or the pattern analyzer.

6. The threat detecting apparatus of claim 4, wherein at least a portion of the first model graph or a portion of the second model graph is hard-wired in the ASIC.

7. A method for detecting a threat, comprising:
receiving a data stream by an interface circuit;
identifying an opcode sequence embedded in the data stream by an opcode detector based on a first model graph, the first model graph including a plurality of interconnected token nodes, each token node of the plurality of interconnected token nodes being representative of an occurrence or a non-occurrence of a token, and each token being a predetermined combination of bits or bytes;
identifying an opcode signature embedded in an identified opcode sequence embedded in the data stream, by a pattern analyzer based on a second model graph, the second model graph including a plurality of interconnected opcode nodes, each opcode node of the plurality of interconnected opcode nodes being representative of an occurrence or a non-occurrence of a predetermined combination of one or more opcodes; and
outputting a signal indicative of a successful identification of the opcode signature embedded in the identified opcode sequence embedded in the data stream based on the second model graph, by the pattern analyzer,
wherein the identifying the opcode sequence embedded in the data stream based on the first model graph comprises traversing the first model graph in N process threads based on the data stream and N possible byte alignments, or traversing the first model graph, which incorporates redundant paths based on the N possible byte alignments of the data stream, in one process thread based on the data stream, wherein the N is an integer greater than one; wherein identifying the opcode sequence embedded in the data stream based on first model graph further comprises: identifying a matched one of a plurality of preamble nodes in the first model graph that matches first X tokens of the data stream, wherein the X being an integer greater than one; moving a pointer to traverse the first model graph starting from the matched one of the plurality of preamble nodes based on other tokens of the data stream in a sequential order; and when the pointer reaches an end node of the first model graph, updating an opcode sequence record to include an opcode corresponding to the end node of the first model graph; wherein identifying the opcode sequence embedded in the data stream based on first model graph further comprises: after identifying an opcode, discarding processed tokens in the data stream and traversing the first model graph based on a remaining portion of the data stream to identify a next opcode in a recursive manner.

8. The method of claim 7, wherein identifying the opcode signature embedded in the identified opcode sequence embedded in the data stream based on the second model graph comprises: moving a pointer to traverse the second model graph from a starting node of the second model graph based on opcodes of the identified opcode sequence embedded in the data stream in a sequential order; and when the pointer reaches an end node of the second model graph, report identification of an opcode signature corresponding to the end node of the second model graph.

9. The method of claim 7, further comprising: retrieving a portion of the first model graph or a portion of the second model graph from a memory circuit.

10. A threat detecting apparatus, comprising:

a threat detection circuit configured to identify an opcode sequence embedded in a data stream based on a first model graph, the first model graph including a plurality of interconnected token nodes, each token node of the plurality of interconnected token nodes being representative of an occurrence or a non-occurrence of a token, and each token being a predetermined combination of bits or bytes;

identify an opcode signature embedded in an identified opcode sequence embedded in the data stream based on a second model graph, the second model graph including a plurality of interconnected opcode nodes, each opcode node of the plurality of interconnected opcode nodes being representative of an occurrence or a non-occurrence of a predetermined combination of one or more opcodes; and output an indication signal indicative of a successful identification of the opcode signature embedded in the identified opcode sequence embedded in the data stream based on the second model graph, wherein the threat detection circuit is configured to identify the opcode sequence embedded in the data stream based on the first model graph by traversing the first model graph in N process threads based on the data stream and N different byte alignments, or by traversing the first model graph, which incorporates redundant paths based on the N possible byte alignments of the data stream, in one process thread based on the data stream, wherein the N is an integer greater than one; wherein identifying the opcode sequence embedded in the data stream based on first model graph further comprises: identify a matched one of a plurality of preamble nodes in the first model graph that matches first X tokens of the data stream, wherein the X being an integer greater than one; move a pointer to traverse the first model graph starting from the matched one of the plurality of preamble nodes based on other tokens of the data stream in a sequential order; and when the pointer reaches an end node of the first model graph, updating an opcode sequence record to include an opcode corresponding to the end node of the first model graph; wherein identify the opcode sequence embedded in the data stream based on first model graph further comprises: after identifying an opcode, discarding processed tokens in the data stream and traverse the first model graph based on a remaining portion of the data stream to identify a next opcode in a recursive manner.

11. The threat detecting apparatus of claim 10, further comprising:

a memory circuit configured to store a set of instructions and at least a portion of the first model graph or at least a portion of the second model graph, wherein the threat detection circuit comprises a processor configured to execute the set of instructions to function as the threat detection circuit.

12. The threat detecting apparatus of claim 10, further comprising wherein the threat detection circuit comprises: an application-specific integrated circuit (ASIC) configured to function as the threat detection circuit.

* * * * *